United States Patent [19]

Udding

[11] Patent Number: 4,921,914
[45] Date of Patent: May 1, 1990

[54] THERMOPLASTIC RUBBER COMPOSITIONS OF CARBOXYL ETHYLENE POLYMER AND BLENDS WITH POLYAMIDE

[75] Inventor: Anne C. Udding, Cm Amsterdam, Netherlands

[73] Assignee: Shell Oil Company, Houston, Tex.

[21] Appl. No.: 341,191

[22] Filed: Apr. 21, 1989

[30] Foreign Application Priority Data

Apr. 28, 1988 [GB] United Kingdom ................ 8810101

[51] Int. Cl.$^5$ .......................... C08L 77/00; C08F 8/00
[52] U.S. Cl. .................................... 525/184; 525/195; 525/240; 525/333.7
[58] Field of Search ..................... 525/333.7, 184, 195, 525/240, 366, 368, 369, 370, 373

[56] References Cited

U.S. PATENT DOCUMENTS

| | | | |
|---|---|---|---|
| 3,200,985 | 11/1965 | Breslow | 525/344 |
| 3,847,854 | 11/1974 | Canter et al. | 524/400 |
| 4,137,203 | 1/1979 | Makowski et al. | 524/394 |
| 4,810,753 | 3/1989 | Koga | 525/183 |

FOREIGN PATENT DOCUMENTS 7205124 4/1972 Netherlands .

OTHER PUBLICATIONS

Research Disclosure, Jun. 1975, 134, #13449.

*Primary Examiner*—Christopher Henderson

[57] ABSTRACT

Disclosed is a composition, a process for making the composition, and blends comprising the composition, wherein the composition comprises (a) an at least partially neutralized carboxylated ethylene-propylene rubber copolymer that is the reaction product of (i) a non-carboxylated ethylene-propylene rubber, (ii) an azido-sulfonylbenzoic acid, and (iii) and a metal based neutralizing agent wherein: (1) the carboxylated copolymer is substantially free of olefinic unsaturation, and (2) the degree of neutralization of the carboxyl groups of the carboxylated copolymer is at least 50 percent, and (b) a zinc carboxylate.

24 Claims, No Drawings

THERMOPLASTIC RUBBER COMPOSITIONS OF CARBOXYL ETHYLENE POLYMER AND BLENDS WITH POLYAMIDE

BACKGROUND OF THE INVENTION

This invention relates to thermoplastic rubber compositions, to the preparation of thermoplastic rubber compostions, and to products made therefrom.

Thermoplastic rubbers are a class of polymers which behave as crosslinked materials at ambient temperatures but display the characteristics of thermoplastic materials at elevated temperatures. A class of thermoplastic rubbers which can be distinguished from the conventional hydrocarbon block copolymer type of thermoplastic rubbers, are the elastomeric ionomers. These thermoplastic rubbers are elastomeric polymers carrying one or more pendant ionic or inorganic salt groups along the polymer backbone. These ionic groups can interact with one another, thereby forming ion-rich aggregates contained in a non-polar polymeric medium.

Elastomeric ionomers are generally formed from elastomeric polymers having one or more acid or acid-reacting groups, such as sulfonic acid or carboxylic acid groups. Such sulfonic acid group-containing elastomers may conveniently be obtained via a direct sulfonation of a preformed, suitable elastomer, for example, an elastomer containing olefinic unsaturated groups and/or arene groups. Carboxylic acid group-containing elastomers may conveniently be prepared by copolymerizing one or more olefinically unsaturated carboxylic acids, such as acrylic or methacrylic acid, with one or more other suitable olefinically unsaturated monomers. However, as the copolymerization is generally conducted in the presence of a radical or redox initiator system, it will generally yield polymers having an incorrect balance of molecular weight and molecular weight distribution for application in thermoplastic rubber compositions.

An alternative method for the preparation of carboxylated elastomers would be the introduction of carboxyl groups via grafting of a suitable olefinically unsaturated carboxylic acid or anhydride, such as maleic anhydride, onto a preformed elastomer. However, it was found that the ionomers obtained by neutralizing such carboxylated elastomers were characterized by insufficient flow at elevated temperature and low tensile strength.

It is therefore an object of the invention to provide improved thermoplastic rubber compositions based on carboxylated elastomeric polymers. It is still another object of the invention to provide thermoplastic rubber compositions based on carboxylated elastomeric polymers which have high flow at elevated temperature, and good tensile strength. It is still another object of the invention to provide a process for making thermoplastic rubber compositions based on elastomeric polymers.

BRIEF SUMMARY OF THE INVENTION

According to the invention, there is provided a thermoplastic rubber composition comprising:

(a) an at least partially neutralized carboxylated elastomeric polymer which is the reaction product of a non-carboxylated elastomeric polymer and at least 0.5 parts by weight (pbw) of an azidosulfonylbenzoic acid per 100 pbw non-carboxylated elastomeric polymer, wherein the elastomeric polymer is substantially free of olefinic unsaturation, a metal-based neutralizing agent has been used for the neutralization of the carboxyl groups, and the degree of neutralization of the carboxyl groups is at least 50 percent, and (b) a zinc carboxylate, based on a linear or branched monocarboxylic acid having at least 12 carbon atoms per molecule, which zinc carboxylate is present in an amount of at least 6 pbw per 100 pbw of said carboxylated polymer.

According to another aspect of the invention there is provided a process for making thermoplastic rubber compositions comprising contacting under polyermization conditions and in any order, an at least partially carboxylated elastomeric polymer, a suitable metal based neutralizing agent, and a suitable plasticizing compound.

DETAILED DESCRIPTION OF THE INVENTION

Generally any elastomeric polymer can be used as the starting material for the carboxylated elastomeric polymer. Preferably, the carboxylated elastomeric polymers of the present invention are based on substantially olefinic unsaturation-free elastomers. Examples of such polymers include elastomeric polymers based on one or more olefins, such as polyisobutylene and ethylene-propylene rubber, as well as hydrogenated elastomeric polymers based on at least a diene monomer, such as hydrogenated styrene butadiene copolymers which, as a result of hydrogenation, are at least substantially free of olefinic unsaturation.

The carboxylated elastomeric polymers may be formed by the reaction of an elastomeric polymer with any suitable azidosulfonylbenzoic acid. Examples of suitable azidosulfonylbenzoic acids include, but are not limited to, 3-azidosulfonylbenzoic acid, 4-azidosulfonyl-pthalic acid and 4-azidosulfonyl-phenozy-acetic acid, as well as such acids having further substituents attached to the aromatic nucleus such as 2-chloro-5-azidosulfonylbenzoic acid, 4-neopentyl-5-azidosulfonylbenzoic acid, 4-ethyl-5-azidosulfonylbenzoic acid and 2-hydrozy-5-azidosulfonylbenzoic acid. The preferred azidosulfonylbenzoic acid is 3-azidosulfonylbenzoic acid.

The azidosulfonylbenzoic acid and the elastomeric polymer may generally be contacted together in any suitable ratio. It has been discovered, however, that the reaction of an azidosulfonylbenzoic acid with the elastomeric polymer does not alway proceed quantitatively. Thus it is preferred in the process of the invention to react at least 1 pbw of the azidosulfonylbenzoic acid with 200 pbw of the elastomeric polymer. Most preferably, from about 1 pbw to about 8 pbw of the acid will be reacted with about 100 pbw of the polymer.

Generally any polymer carrying ionic groups can be considered to be an ionomer. However, in order to obtain the characteristics of a fully-crosslinked polymer, such an ionomer should carry on average more than two ionic groups per molecule (molar functionally greater than two). Such fully-crosslinked ionomers can be obtained by neutralizing polymers carrying on average just over two functional groups (e.g. carboxyl or sulfonic acid groups), to a degree of 100 percent. Alternatively, similar performance may be achieved with a functionalized polymer having a molar functionality considerably higher than two and which has been neutralized to such a degree as to provide the polymer with on average just over two ionic groups per molecule.

As used herein the term "degree of neutralizaton" refers to the number of metal equivalents of the metal-based neutralizing agent used per equivalent of carboxyl group multiplied by 100 percent. Thus when the degree of neutralization exceeds 100 percent, it indicates the presence of an excess of neutralizing agent, which excess of neutralizing agent is thus also present in the thermoplastic rubber compositions based on such a carboxylated elastomer having a degree of neutralization greater than 100 percent.

Generally any neutralizing agent may be employed, although metal-based neutralizing agents are preferred. Examples of such metal-based neutralizing agents include oxide-, hydroxide-, salt- and alcoholate-type neutralizing agents, including, for example, magnesium hydroxide and zinc oxide. When the neutralizing agent is a salt-type neutralizing agent, the salt should be based on an acid having a higher pKa than that of the carboxyl groups present in the carboxylated elastomer. Metal oxide-type neutralizing agents are the most preferred, with zinc oxide (ZnO) being the preferred oxide-type neutralizing agent.

Generally the degree of neutralization of the carboxyl groups will be at least 50 percent. Although it could be expected that the highest degree of coherence for a given carboxylated polymer, as demonstrated by low flow at elevated temperatures and a high tensile strength, would be obtained with fully crosslinked polymers, i.e., those with a degree of neutralization of 100 percent, it has surprisingly been found that a degree of neutralization exceeding 100 percent may have a beneficial influence on the tensile properties of the compositions of the present invention. Thus it is preferred to employ carboxylated elastomeric polymers having a degree of neutralization of at least 200 percent.

It is desirable that the compositions of the invention demonstrate some degree of thermoplasticity. Generally the neutralized carboxylated elastomeric polymers of the present invention, particularly those approaching 100 percent neutralization, will demonstrate very little or no flow at elevated temperatures, and will require the admixture of a plasticizing compound in order to achieve a sufficient degree of thermoplasticity. Zinc carboxylates have been found to be very suitable plasticizers. Although any zinc carboxylate can be used, the carboxylic acid whereon the zinc carboxylate is based, is preferably a linear or branched monocarboxylic acid having at least 12 carbon atoms per molecule. Most preferably the linear monocarboxylic acid is a fatty acid, with stearic acid being the preferred fatty acid. The preferred zinc carboxylate is zinc stearate. The amount of plasticizer is preferably at least 6 pbw of plasticizer for each 100 pbw of polymer. Most preferably the weight ratio is in the range of about 10:100 to about 50:100.

The zinc carboxylate employed in the present invention may also be prepared in situ, by mixing the corresponding carboxylic acid having at least 12 carbon atoms in its molecule and an amount of neutralizing agent which is preferably at least sufficient to neutralize the carboxyl groups of the carboxylated elastomer as well as those of the carboxylic acid.

The thermoplastic rubber compositions of the present invention may be prepared by mixing at an elevated temperature the at least partially carboxylated elastomeric polymer, a sufficient amount of the neutralizing agent to effect a degree of neutralization of the carboxyl groups of at least 50 percent, and at least 6 pbw of the plasticizer. The mixing of the elastomer with neutralizing agent and the plasticizing compound may be conducted simultaneously or separately. The order of mixing is not critical. The mixing may be conducted by any suitable means in any suitable container, but is preferalby conducted in an internal mixer or in an extruder at a temperature which is generally in the range of from about 120° C. to about 180° C., or on a rubber mill at a temperature in the range of from about 70° C. to about 120° C.

Generally compounds that are used in thermoplastic rubber compounding can be incorporated in the thermoplastic rubber composition of the present invention. Examples include pigments, dyes, fillers, processing acids, stabilizers, antioxidants and the like, which can be conveniently incorporated using an internal mixer or a rubber mill.

It has been found that the thermoplastic urbber compositions of the present invention are eminently suited for blending with polyamide polymers, as this leads to blends with a high degree of dispersion, that is, a particle size of less than 10 nm, and a very good physical stability, so that the resulting samples made from these blends will show no signs of delamination. The impact resistance properties of the blends were found to be considerably improved compared to those of the unmodified polyamide polymer. The blends can generally be prepared employing a mole ratio of polyamide polymer to thermoplastic rubber composition in the range of about 65:35 to about 95:5, preferably from about 75:25 to about 90:10. In view of the high melting point of polyamides, the blending is generally conducted at temperatures well above 200° C., generally in the range of about 220° C. to about 260° C. Nylon-6 is a preferred polyamide polymer for use in such blends.

EXAMPLES

The following are used in examples 1 through 21:

Vistalon ® 404, Vistalon 457, and Vistalon 504 are all Exxon-supplied ethylene-propylene rubber, with ethylene contents of 40, 45 and 52 mole percent respectively. ASB is 3-azidosulfonylbenzoic acid. Ionox®-330, an antioxidant, is 1,3,5-trimethyl1-2,4,6-tris(3,5-di-tert-butyl-4-hydroxy-benzyl) benzene. Akulon® Polyamide 6 is a Nylon-6 type polyarmid (AKZO Plastics).

In the examples, the following methods are used for product characterization:

Melt index was determined according to ASTM D 1238-L at 190° C. using a load of 12.5 kg. The tensile strength, tensile yield stress and elongation at break were determined according to ISO R 527, and elongation at yield was determined from the stress-strain curves obtained according to ISO R 527. The notched charpy impact was determined according to ISO 170, and flexural strength was determined according to ASTM D-790.

EXAMPLES 1 THROUGH 4

These examples illustrate the preparation of thermoplastic rubber compositions based on charboxylated ethylene-propylene rubber (EPR) with various degrees of carboxylation.

Vistalon 404 was blended with ASB in ratios shown in Table 1 at 100° C. on a rubber mill. Subsequently, amounts of the thus prepared blends corresponding with 50 g rubber were fed into an internal mixer (50 ml Brabender Plastograph) equiped with kneading screws and having a temperature of 190° C. The mixer was operated at a speed of 30 revolutions per minute. The total mixing time was 5 minutes, during which the temperature was raised to 210° C. After removal from the mixer, the mixture was allowed to cool to 20° C. elemental analysis for nitrogen and sulfur applied to the polymer after a double, sequential, dissolving/precipitation treatment with toluene and methanol, respectively, showed that between 60 to 65 percent of the ASB had become attached to the polymer.

The carboxylated polymers were subsequently blended on a rubber mill at 120° C. for approximately 5 minutes with ZnO or NaOCH$_3$, zinc stearate and Ionox-330 in amounts as indicated in Table 1.

Samples for testing were prepared from the thus-prepared thermoplastic rubber compositions via compression molding. The composition and corresponding performance data are given in Table 1.

TABLE 1

| Example | 1 | 2 | 3 | 4 |
|---|---|---|---|---|
| EPR (Vistalon 404) | 100 | 100 | 100 | 100 |
| ASB (pbw) | 2 | 4 | 6 | 6 |
| V$_1$ % carboxylation | 70 | 66 | 62 | 62 |
| Carboxylated EPR (pbw) | 100 | 100 | 100 | 100 |
| ZnO (pbw) | 10 | 10 | 10 | — |
| NaOCH$_3$ (pbw) | — | — | — | 2 |
| V$_2$ % Neutralization | 3987 | 2143 | 1525 | 177 |
| Zinc stearate (pbw) | 30 | 30 | 30 | 30 |
| Ionox-330 (pbw) | 1 | 1 | 1 | 1 |
| Melt Index (g/10 min) | 25.4 | 17.3 | 5.4 | 5.6 |
| Tensile strength (MPa) | 9.3 | 14.0 | 17.0 | 17.3 |
| Elongation at break (%) | 1280 | 1040 | 960 | 970 |

EXAMPLES 5 THROUGH 11

These examples demonstrate the preparation of thermoplastic rubber compostions based on carboxylated EPR, having a variation in the degree and type of neutralizing agent and zinc stearate content.

A blend of Vistalon 504 and and ASB in a weight ratio of 100:6 was prepared following the procedure as described in Examples 1 through 4. The subsequent carboxylation reaction was conducted in co-rotating twin-screw extruder (Werner/Pfleiderer) having twin 28 mm diameter bores and a length/diameter ratio of 27.6. The feed section of the extruder was held at a temperature of approximately 30° C. while the temperature of the five subsequent sections was set at 170° C., 210° C., 210° C., 205° C. (devolatilizing section) and 210° C. respectively. The extruder was operated at 30 rpm and residence time was 2-4 minutes.

The carboxylated EPR was mixed with ZnO or Mg(OH)$_2$ and zinc stearate in amounts as indicated in Table 2 and following the procedure as described in Examples 1 through 4, to arrive at the thermoplastic rubber compostitions, and the corresponding samples for testing. The compostion data and the corresponding performance data are given in Table 2.

EXAMPLE 12

This is a control showing the effect of carboxylating with a material other than an azidosulfonylbenzoic acid. Following the procedure as described in Examples 1 through 4, Vistalon 504 was carboxylated with 1.19 pbw of maleic anhydride (which amount contains the same number of acid equivalents as 6 pbw of ASB) in the presence of 0.12 pbw of dicumyl peroxide both amounts per 100 pbw of EPR. The resulting carboxylated rubber was subsequently mixed with ZnO and zinc stearate to arrive at a thermoplastic rubber composition. Results are presented in Table 2.

EXAMPLE 13

In this control, a thermoplastic rubber compound based on Vistalon 504 carboxylated with 6 pbw of ASB, was prepared following the procedure as described in Example 3, but replacing the 30 pbw of zinc stearate with 40 pbw of paraffinic extender oil (Paraffinic Oil 103, Witco). Results are presented in Table 2.

EXAMPLES 14 THROUGH 16

These examples demonstrate the preparation of thermoplastic rubber compositions based on carboxylated EPR with a variation in the type of EPR. The three types of EPR were carboxylated with 6 pbw of ASB per 100 pbw of the EPR and subsequently formulated to thermoplastic rubber compositions by mixing with ZnO and zinc stearate following the procedure as described in Examples 1 through 4. Results are presented in Table 3.

TABLE 2

| Example Comp. Experiment | | 5 | 6 | 7 | 8 | 9 | 10 | 11 | 12 | 13 |
|---|---|---|---|---|---|---|---|---|---|---|
| Carboxylated Vistalon 504 | pbw | 100 | 100 | 100 | 100 | 100 | 100 | 100 | 100* | 100 |
| V$_1$ Degree of carb. | % | 62 | 62 | 62 | 62 | 62 | 62 | 62 | — | 62 |
| ZnO | pbw | 5 | 5 | 5 | 10 | 10 | 10 | — | 10 | 10 |
| Mg(OH)$_2$ | " | — | — | — | — | — | — | 0.8 | — | — |
| V$_2$ Degree of neutr. | % | 731 | 731 | 731 | 1525 | 1525 | 1525 | 115 | — | 1525 |
| Zinc stearate | pbw | 30 | 40 | 50 | 30 | 40 | 50 | 30 | 30 | — |
| Paraffinic oil | " | — | — | — | — | — | — | — | — | 40 |
| Melt Index | g/10 min. | 2.7 | 5.0 | 6.6 | 2.6 | 5.0 | 6.4 | 1.9 | >50(0.9)** | 0.2 |
| Tensile Strength MPa | | 26.9 | 28.5 | 22.8 | 25.8 | 26.6 | 21.0 | 11.8 | 1.9(0.85)** | 15 |
| Elongation at break | % | 815 | 855 | 860 | 840 | 840 | 865 | 855 | 685 | 900 |

*EPR carboxylated with maleic anhydride
**Values obtained in absence of zinc stearate

TABLE 3

| Example | | 14 | 15 | 16 |
|---|---|---|---|---|
| EPR type | | Vistalon 404 | Vistalon 457 | Vistalon 504 |
| Ethylene content | % | 40 | 45 | 52 |
| Carboxylated EPR (6 pbw ASB) | pbw | 100 | 100 | 100 |
| V$_1$ Degree of carb. | % | 62 | 62 | 62 |
| ZnO | pbw | 10 | 10 | 10 |
| V$_2$ Degree of neutr. | % | 1525 | 1525 | 1525 |
| Zinc stearate | pbw | 30 | 30 | 30 |
| Melt Index | g/10 min | 5.4 | 6.6 | 2.6 |
| Tensile strength | MPa | 17.0 | 17.3 | 25.8 |
| Elongation at break | % | 960 | 910 | 840 |

EXAMPLES 17 THROUGH 21

These examples show the preparation of blends of filler and extender oil with the inventive thermoplastic rubber compositions. Thermoplastic rubber compositions based on different carboxylated EPR's were prepared by mixing the carboxylated rubbers on a rubber mill at 120° C. with different types of fillers and in a number of cases also with a naphthenic extender oil (Shell Flex 451), in addition to the mixing thereof with ZnO and zinc stearate, in amounts and of the type as shown in Table 4. Samples for testing the compositions were prepared via compression molding for the Vistalon 404 and 457 based compositions, and via injection molding for the Vistalon 504 based compositions. Results are presented in Table 4.

EXAMPLES 22 THROUGH 23

These examples show the preparation of blends of the inventive thermoplastic rubber composition with Nylon-6. Blends of thermoplastic rubber compositions, as prepared in Example 3, and Nylon-6, were prepared by mixing them in the 50 ml Brabender Plastograph at a temperature of 240° C. for 5 minutes. Samples for testing the performance aspects of these blends were prepared via compression molding. Results are presented in Table 5.

TABLE 4

| Example | | 17 | 18 | 19 | 20 | 21 |
|---|---|---|---|---|---|---|
| EPR type | | Vistalon 457 | Vistalon 457 | Vistalon 404 | Vistalon 504 | Vistalon 504 |
| Carboxylated EPR (6 pbw ASB) | pbw | 100 | 100 | 100 | 100 | 100 |
| ZnO | " | 10 | 10 | 10 | 10 | 10 |
| Zinc stearate | " | 30 | 30 | 30 | 40 | 40 |
| HAF | " | 40 | — | 40 | — | — |
| Silteg AS$_7$ | " | — | 40 | — | — | — |
| TiO$_2$ | " | — | 8 | — | — | — |
| Polypropylene powder | " | — | — | — | 40 | 40 |
| Naphthenic oil | " | — | — | 50 | — | 50 |
| Melt Index | g/10 min | 1.4 | 0.9 | 65 | 28 | 130 |
| Tensile Strength | MPa | 16.4 | 11.9 | 10.3 | 14.9 | 11.5 |
| Elongation at break | % | 720 | 790 | 1060 | — | — |

EXAMPLE 24

This is a control example preparing a blend following the procedures as described in Examples 22 through 23, except that the blend prepared is based on carboxylated Vistalon 404 (6 pbw ASB) instead of on the thermoplastic rubber compound. Samples for testing the blend were prepared via compression molding.

EXAMPLE 25

This is a control in which Nylon-6 as such is submitted to a heat treatment in the Brabender Plastograph, similar to the heat treatment the blends received in Examples 22 through 24. Samples for testing the Nylon-6 were prepared via compression, with results presented in Table 5.

TABLE 5

| Example | | 22 | 23 | 24 | 25 |
|---|---|---|---|---|---|
| Thermoplastic rubber comp. ex Example III | pbw | 20 | 20* | — | — |
| Nylon-6 | " | 80 | 80 | 80 | 100 |
| Carboxylated Vistalon 404 (6 pbw ASB) | " | — | — | 20 | — |
| Melt Index | g/10 min | 6.2 | 5.3 | 3.3 | 2.6 |
| Charpy Impact Strength (notched) | KJ/m$^2$ | 6.2 | 5.1 | 3.2 | 1.3 |
| Yield Stress | MPa | 32 | 32 | 22 | 53 |
| Elongation at yield | % | 18 | 20 | 9 | 10 |
| Flexural strength at 5% strain | MPa | 58 | 59 | 45 | 88 |
| Blend dispersion | | excellent | excellent | very good | — |

*Composition contains only 10 pbw of zinc stearate per 100 pbw of carboxylated EPR

I claim:
1. A composition comprising:
   (a) an at least partially neutralized carboxylated ethylene-propylene rubber copolymer which is the reaction product of (i) a non-carboxylated ethylene-propylene rubber, (ii) at least 0.5 parts by weight of an azidosulfonylbenzoic acid per 100 parts by weight of non-carboxylated ethylene-propylene rubber, and (iii) a metal based neutralizing agent, wherein:
   (1) the carboxylated copolymer is substantially free of olefinic unsaturation;
   (2) the degree of neutralization of the carboxyl groups of the carboxylated copolymer is at least 50 percent; the metal or (iii) is selected from the group consisting of magnesium, sodium and zinc;
   (b) at least about 6 pbw per 100 pbw of the carboxylated copolymer of a zinc carboxylate based on an acid compound selected from the group consisting of linear and branched monocarboxylic acids having at least 12 carbon atoms.
2. The composition of claim 1 wherein the neutralizing agent is a zinc-based neutralizaing agent.
3. The composition of claim 2 wherein the linear monocarboxylic acid is a fatty acid.
4. The composition of claim 3 wherein the fatty acid is stearic acid, the neutralizing agent is zinc oxide, and the azidosulfonylbenzoic acid is 3-azidosulfonylbenzoic acid.
5. The composition of claim 4 wherein the zinc carboxylate is present in an amount from about 10 to about 50 parts by weight per 100 parts by weight of carboxylated copolymer the degree of neutralization of the carboxyl groups is at least 200 percent, and the 3-azidosulfonylbenzoic acid is present in a concentration of at least about 8 parts by weight per 100 parts by weight of the non-carboxylated ethylene-propylene rubber copolymer.
6. The composition of claim 1 wherein the linear monocarboxylic acid is a fatty acid.
7. The composition of claim 6 wherein the neutralizing agent is a zinc-based neutralizing agent.
8. The composition of claim 7 wherein the zinc carboxylate is present in an amount from about 10 to about 50 parts by weight per 100 parts by weight of carboxyl- ated copolymer, the degree of neutralization of the carboxyl groups is at least 200 percent, and the azidosulfonylenzoic acid is present in a concentration of at least about 8 parts by weight per 100 parts by weight of the non-carboxylated ethylene-propylene rubber copolymer.

9. The composition of claim 8 wherein the fatty acid is stearic acid, the azidosulfonylbenzoic acid is 3-azidosulfonylbenzoic acid, and the neutralizing agent is zinc oxide.

10. The composition of claim 1 wherein the zinc carboxylate is present in an amount from about 10 to about 50 parts by weight per 100 parts by weight of carboxylated copolymer, the degree of neutralization of the carboxyl groups is at least 200 percent, and the azidosulfonylbenzoic acid is present in a concentration of at least about 8 parts by weight per 100 parts by weight of non-carboxylated ethylene-propylene rubber copolymer.

11. The composition of claim 10 wherein the linear monocarboxylic acid is a fatty acid, and the neutralizing agent is a zinc-based neutralizing agent.

12. The composition of claim 11 wherein the fatty acid is stearic acid, the azidosulfonylbenzoic acid is 3-azidosulfonylbenzoic acid, and the neutralizing agent is zinc oxide.

13. The composition of claim 1 wherein the degree of neutralization of the carboxyl groups is at least 200 percent.

14. The composition of claim 13 wherein the the linear monocarboxylic acid is a fatty acid, and the neutralizing agent is a zinc-based neutralizing agent.

15. The composition of claim 14 wherein the fatty acid is stearic acid, the azidosulfonylbenzoic acid is 3-azidosulfonylbenzoic acid, and the neutralizing agent is zinc-oxide.

16. The composition of claim 15 wherein the zinc carboxylate is present in an amount from about 10 to about 50 parts by weight per 100 parts by weight of carboxylated copolymer, and the 3-azidosulfonylbenzoic acid is present in a concentration of at least about 8 parts by weight per 100 parts by weight of non-carboxylated ethylene-propylene rubber.

17. A blend comprising about 5 to about 35 weight percent of the composition of claim 1 and about 65 to about 95 mass percent of a polyamide polymer.

18. A blend comprising about 10 to about 25 weight percent of the composition of claim 1 and about 75 to about 90 weight percent of a polyamide polymer.

19. A blend comprising about 5 to about 35 weight percent of the composition of claim 10 and about 65 to about 95 weight percent of a polyamide polymer.

20. A blend comprising about 10 to about 25 weight percent of the composition of claim 10 and about 75 to about 90 weight percent of a polyamide polymer.

21. A blend comprising about 5 to about 35 weight pecent of the composition of claim 13 and about 65 to about 95 weight percent of a polyamide polymer.

22. A blend comprising about 10 to about 25 weight percent of the composition of claim 13 and about 75 to about 90 weight percent of a polyamide polymer.

23. A blend comprising about 5 to about 35 weight percent of the composition of claim 16 and about 65 to about 95 weight percent of a polyamide polymer.

24. A blend comprising about 10 to about 25 weight percent of the composition of claim 16 and about 75 to about 90 weight percent of a polyamide polymer.

* * * * *